United States Patent
Yamane et al.

(10) Patent No.: US 7,998,385 B2
(45) Date of Patent: Aug. 16, 2011

(54) METHOD FOR PRODUCING MULTILAYER STRETCH-MOLDED ARTICLE

(75) Inventors: Kazuyuki Yamane, Fukushima-Ken (JP); Ryo Kato, Fukushima-Ken (JP); Hisanori Tobita, Ibaraki-Ken (JP)

(73) Assignee: Kureha Corporation, Tokyo (JP)

( * ) Notice: Subject to any disclaimer, the term of this patent is extended or adjusted under 35 U.S.C. 154(b) by 1059 days.

(21) Appl. No.: 10/573,565

(22) PCT Filed: Sep. 29, 2004

(86) PCT No.: PCT/JP2004/014682
§ 371 (c)(1), (2), (4) Date: Mar. 27, 2006

(87) PCT Pub. No.: WO2005/032800
PCT Pub. Date: Apr. 14, 2005

(65) Prior Publication Data
US 2006/0255495 A1    Nov. 16, 2006

(30) Foreign Application Priority Data
Oct. 1, 2003    (JP) .................................. 2003-343404

(51) Int. Cl.
B29C 55/00    (2006.01)
(52) U.S. Cl. ................. 264/173.15; 264/165; 264/171.1; 264/173.12; 264/173.16; 264/173.19
(58) Field of Classification Search ............. 264/173.15, 264/165, 171.1, 173.12, 173.16, 173.19
See application file for complete search history.

(56) References Cited

U.S. PATENT DOCUMENTS

| | | | | |
|---|---|---|---|---|
| 5,853,639 A | * | 12/1998 | Kawakami et al. | ...... 264/177.19 |
| 6,159,416 A | | 12/2000 | Kawakami et al. | |
| 6,245,437 B1 | * | 6/2001 | Shiiki et al. | .................. 428/483 |

FOREIGN PATENT DOCUMENTS

| | | |
|---|---|---|
| EP | 1 225 196 | 7/2002 |
| JP | 3-43140 | 2/1991 |
| JP | 10-337772 | 12/1998 |
| JP | 2003-20344 | 1/2003 |
| JP | 2003-136657 | 5/2003 |
| WO | 01/98081 | 12/2001 |

OTHER PUBLICATIONS

Web page retrieved from http://www.cem.msu.edu/~reusch/VirtualText/polymers.htm.*

* cited by examiner

*Primary Examiner* — Yogendra N Gupta
*Assistant Examiner* — John P Robitaille
(74) *Attorney, Agent, or Firm* — Wenderoth, Lind & Ponack, L.L.P.

(57) ABSTRACT

A transparent multilayer stretched product is produced through a process including: providing a resin laminate including at least on layer of polyglycolic acid resin, heat-forming and cooling the resin laminate, reheating the resin laminate until the polyglycolic acid resin is crystallized to be opaque and then stretching the reheated resin laminate. The thus-obtained multilayer stretched product is excellent in gas-barrier property in addition to the transparency and is suitable as a packaging material or container.

7 Claims, No Drawings

METHOD FOR PRODUCING MULTILAYER STRETCH-MOLDED ARTICLE

TECHNICAL FIELD

The present invention relates to a transparent multilayer stretched product suitable for use as a packaging material or container having a gas-barrier property. The resultant transparent multilayer stretched product is useful as a packaging material or container for foods, drugs, etc.

BACKGROUND ART

Polyester-type polymers, particularly polyethylene terephthalate (i.e., terephthalic acid-ethylene glycol polycondensation product) generally called a "PET resin" is widely used for providing a packaging material for beverages having a shape of typically a bottle, that is so-called "PET bottle", because of its transparency, rigidity, easiness of forming, etc.

The scope of applied uses is being enlarged year by year, and some application requires the minimization of oxygen or carbon dioxide transmission therethrough depending on the content materials, so that it is desired to improve the gas-barrier property of PET resin.

As a means for improving the gas-barrier property of PET resin, a multilayer product of PET and polyglycolic acid resin has been disclosed (U.S. Pat. No. 4,424,242 to Barbee), but in the Examples thereof, the films of these resins were pressed together at 210° C., so that because of poor adhesion therebetween, these films are presumed to be liable to peel from each other and be accompanied with difficulty, such as poor appearance and difficulty in maintenance of the performances.

For providing PET bottles, PET is frequently formed by the so-called hot parison scheme wherein PET is stretched and blown within a period prior to crystallization of PET, or the so-called cold parison scheme wherein after being injection-molded, PET is quenched to form an amorphous product (called a preform), which is reheated to above Tg, stretched and blown.

Recently, there has been studied a trial of forming a multilayer product of polyglycolic acid resin and such a PET resin and stretch-blowing it to form a multilayer bottle. However, as polyglycolic acid resin has high crystallinity, it causes whitening due to crystallization before stretch-blowing either according to the hot parison scheme or according to the cold parison scheme. When such a crystallized polyglycolic acid resin is forcibly stretched, it is liable to cause puncture or breakable, or stretching irregularity. For these difficulties, it has been believed impossible at all to form a multilayer stretched product, such as gas-barrier bottle, including polyglycolic acid resin.

DISCLOSURE OF INVENTION

The present invention aims at providing a transparent multilayer stretched product suitable as a gas-barrier packaging material or container including a polyglycolic acid resin layer.

More specifically, the present invention provides a process for producing a transparent multilayer stretched product, comprising: providing a resin laminate including at least one layer of polyglycolic acid resin, heat-forming and cooling the resin laminate, reheating the laminate until the polyglycolic acid resin layer is crystallized to be opaque, and then stretching the re-heated resin laminate.

Some description of a history through which the present inventors have made various studies with above-mentioned object and arrived at the present invention, will be briefly made.

The present inventors, et al, have proposed a multilayer stretched product based on a finding that a laminate obtained by using a copolymer of glycolic acid as a polyglycolic acid resin and laminating it with another thermoplastic resin, such as PET, can be stretched at a temperature exceeding Tg while alleviating crystallization accompanied with whitening (WO-A 03/099562). However, the use of polyglycolic acid resin in the form of a copolymer adversely affects the gas-barrier property which is a characteristic thereof, so that the use of a higher glycolic acid content polymer is desired even if a copolymer is used, and more preferably the use of glycolic acid homopolymer is desired, if at all possible, for providing a multilayer stretched product suitable as a gas-barrier packaging material or container.

As a result of further study in view of the above, the present inventors have found that in the case of using a polyglycolic acid resin having a very high polyglycolic acid content and a high gas-barrier property, when a resin laminate including a layer of such a polyglycolic acid resin is allowed to cause crystallization of the polyglycolic acid resin to such a degree as to cause a whitening up to a haze of 40% or higher obstructing seeing therethrough unlike the conventional case of forcibly suppressing the crystallization of polyglycolic acid resin, a stretching can be rather smoothly accomplished to provide a multilayer stretched product clarified to exhibit a haze of 10% or below if the stretching is performed after uniformly heating and crystallizing the laminate to a temperature exceeding the crystallization temperature. As a result of further study thereafter, it is considered that the above phenomenon is attributable to occurrence of so-called "crystal stretching" which has been studied with respect to another resin (e.g. "Crystal Stretching of Polyethylene Terephthalate", Journal of The Society of Fiber Science and Technology, Japan, Vol. 21, No. 103 (1965), pp. 528-535). More specifically, it is presumed that polyglycolic acid molecular chain crystallized to such a degree as to cause noticeable whitening is re-arranged due to crystal stretching to be clarified, whereas it has not been known heretofore and was a really unexpected discovery that polyglycolic acid resin has capability of crystal stretching accompanied with remarkable clarification. The present invention is based on the above finding.

BEST MODE FOR PRACTICING THE INVENTION

Hereinbelow, the process for producing a multilayer stretched product according to the present invention will be described more specifically in order with respect to preferred embodiments thereof.

(Polyglycolic Acid Resin)

A principal component layer of the multilayer stretched product produced according to the present invention comprises a polyglycolic acid resin (hereinafter sometimes referred to as a "PGA resin"). The PGA resin may include homopolymer or copolymer including glycolic acid-recurring unit represented by formula (I) below:

The above glycolic acid unit can also be provided by polycondensation of glycolic acid, glycolic acid alkyl ester or glycolic acid salt but may preferably be provided by ringopening polymerization of glycolide (GL) that is a bimolecular cyclic ester of glycolic acid.

In the multilayer stretched product of the present invention, the polyglycolic acid resin layer may preferably be incorporated as a gas-barrier resins layer. It is preferred that the polyglycolic acid resin layer functions as an effective gas-barrier resin layer even when included as a layer occupying 10 wt % or less in a resin laminate with another thermoplastic resin. In order to form such an excellent gas-barrier resin, it is possible to use a copolymer (PGA copolymer) containing at least 80 wt %, preferably at least 85 wt %, particularly preferably at least 90 wt %, most preferably 95 wt %, of polyglycolic acid (PGA) polymerized units, whereas homopolymer (PGA homopolymer) should be selected in order to obtain the highest level of gas-barrier property. PGA resin having such a high PGA polymerized unit content naturally has a high crystallinity and can be very advantageously used in the process for producing a multilayer stretched product according to the present invention relying on crystal stretching as an essential factor.

Examples of comonomer providing PGA copolymer together with a glycolic acid monomer, such as the above-mentioned glycolide, may include: cyclic monomers, such as ethylene oxalate (i.e., 1,4-dioxane-2,3-dione), lactides, lactones (e.g., β-propiolactone, β-butyrolactone, pivalolactone, γ-butyrolactone, δ-valerolactone, β-methyl-δ-valerolactone, and ε-caprolactone), carbonates (e.g., trimethylene carbonate), ethers (e.g., 1,3-dioxane), either esters (e.g., dioxanone), amides (ε-caprolactam); hydroxycarboxylic acids, such as lactic acid, 3-hydroxypropanoic acid, 3-hydroxybutanoic acid, 4-hydroxybutanoic acid and 6-hydroxycaproic acid, and alkyl esters thereof; substantially equi-molar mixtures of aliphatic diols, such as ethylene glycol and 1,4-butanediol, with aliphatic dicarboxylic acids, such as succinic acid and adipic acid, or alkyl esters thereof; and combinations of two or more species of the above. Among these, it is preferred to use a comonomer selected from the group consisting of lactide (LA; including optical isomers, such as L-lactide (LLA), D-lactide and DL-lactide (DLLA)), trimethylene carbonate and caprolactone (CL).

The PGA resin may preferably have a weight-average molecular weight (based on polymethyl methacrylate) in a range of 50,000-800,000 according to GPC measurement using hexafluoroisopropanol solvent. If the weight-average molecular weight is too low, it can have only weak strength and is liable to craze or crack at the time of stretching, etc. If the weight-average molecular weight is too large, the resin layer thicknesses are liable to be non-uniform at the time of laminate forming, thus failing to provide a good stretched product, and the PGA resin is liable to generate heat due to shearing force exerted by screw at the time of melt-processing, cause coloring of the resin at the time of processing to form pellets or forming into the product and cause poor appearance by occurrence of irregularity (or flow marks) in the product due to poor melting. A weight-average molecular weight of ca. 120,000-300,000 is further preferred.

As preferred thermal properties for smoothly practicing the crystal stretching in the present invention, the PGA resin may preferably have Tg (glass transition temperature) of 30-55° C., more preferably 35-50° C.; Tc1 (crystallization temperature in the course of temperature increase) of 60-135° C., more preferably 65-120° C.; Tc2 (crystallization temperature in the course of temperature decrease) of 140-200° C., more preferably 145-195° C.; Tm (melting point) of 150-230° C., more preferably 180-225° C.

In the polyglycolic acid resin layer, it is possible to incorporate another thermoplastic resin in addition to the above-mentioned PGA resin, but even in that case, it is preferred that the polymerized PGA units should occupy as high a percentage as possible and at least 80 wt % of the resin constituting the polyglycolic acid resin layer. It is further preferred that the polyglycolic acid resin layer is composed of the PGA resin alone (though possibly containing additives such as a thermal stabilizer therefor) to effectively proceed with its crystal stretching.

To 100 wt. parts of the PGA resin, it is possible to add 0.003-3 wt. parts, more preferably 0.005-1 wt. part, of a thermal stabilizer. The thermal stabilizer may be selected from compounds functioning as anti-oxidants for polymers, and among those, it is preferred to use, e.g., heavy metal-deactivating agents, phosphoric acid esters including a pentaerythrithol skeleton (or a cyclic neopentane-tetra-il structure) and represented by formula (II) below, phosphor compounds having at least one hydroxyl group and at least one long-chain alkyl ester group and represented by formula (III) below, and metal carbonate salts. These compounds can be used singly or in combination of two or more species.

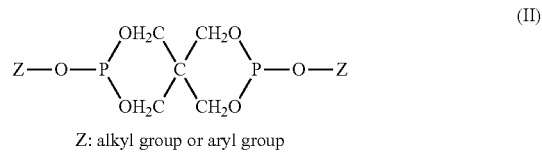

Z: alkyl group or aryl group

R: alkyl group (Another Thermoplastic Resin Layer)

According to the present invention, a resin laminate is formed by disposing another thermoplastic resin layer in lamination with the above-mentioned polyglycolic acid resin layer.

As such another thermoplastic resin, it is possible to use an arbitrary thermoplastic resin which can be laminated with the PGA resin layer as by extrusion lamination, dry lamination or wet lamination; coating; or co-extrusion or co-injection with PGA resin.

More specifically, preferred examples of such another thermoplastic resin may include: polyester resins, such as polyethylene terephthalate and polyethylene naphthalate, polystyrene resins, acrylic acid or methacrylic acid resins, nylon resins, sulfide resins such as polyphenylene sulfide, and polycarbonate resins. Among these, it is preferred to use a polyester resin, particularly an aromatic polyester resin composed of a diol component and a dicarboxylic acid component, of which at least one, particularly the dicarboxylic acid component, is an aromatic one, in order to provide a multilayer product which satisfies transparency and gas-barrier property in combination depending on the use thereof.

Another preferred class of such another thermoplastic resin may include another biodegradable resin capable of providing a multilayer stretched product having a high biodegradability as a whole together with the PGA resin layer. Examples thereof may include: other aliphatic polyesters, such as polylactic acid, succinic acid-glycol polycondensate and polycaprolactone, and partially aromatic polyesters (e.g., "BIOMAX", made by Du Pont and Co., a succinic acid-based partially aromatic polyester).

(Resin Laminate)

The content of the polyglycolic acid resin layer in the multilayer stretched product, i.e., ordinarily in the resin laminate subjected to stretching, may preferably 1-10% on the basis of weight (nearly equal to the percentage based on thickness). In excess of 10 wt %, the PGA resin layer is liable to cause excessive crystallization at the time of heating for stretching of the resin laminate so that a considerably layer stress is required for the stretching, and such a thick polyglycolic acid resin layer tends to be less clarified even by the crystal stretching. Below 1 wt %, the gas-barrier property of the resultant multilayer stretched product is liable to be insufficient, and it becomes difficult to achieve the object of the present invention to provide a multilayer stretched product having good gas-barrier property in combination with transparency.

In the process of the present invention, the above-mentioned resin laminate of polyglycolic acid resin and another thermoplastic resin formed by co-extrusion, co-injection, extrusion lamination, etc., is once cooled.

In the case where the multilayer stretched product is in the form of a bottle, a so-called preform is taken out of a mold, etc., after the cooling. The PGA resin in this stage is amorphous and transparent. An amorphous preform ordinarily has a thickness of ca. 2-10 mm and exhibits a haze of ordinarily below 40% at a thickness of 3 mm while tending to exhibit a higher haze at a larger thickness.

In the case of producing a film or sheet product, the resin laminate is obtained as a film or sheet which has been melt-processed and extruded out of an extruder. The film or sheet is ordinarily cooled on a roller mold, etc. and the PGA resin is taken out in an amorphous and transparent state. Such a film or sheet a thickness of ordinarily ca. 30 μm to 3 mm and exhibits a haze of ordinarily below 10% at a thickness of 200 μm while tending to exhibit a higher haze at a higher thickness.

(Heating Prior to Stretching of Resin Laminate)

The resin laminates having hazes exceeding the above values in the respective forms after the cooling cannot be stretched in most cases because of large spherulites formed during the cooling crystallization. Even if stretching becomes possible by heating thereafter, uniform stretching is difficult.

Then, according to the present invention, the resin laminate having a haze of below 40% in any case is subjected to heating accompanied with crystallization as to provide a haze of at least 40%, whereby a transparent form product is obtained through a stretching subsequent thereto. While the mechanism has not been fully clarified as yet, it is considered that as a result of the heating accompanied with crystallization up to a haze of at least 40%, the polyglycolic acid resin forms a uniform crystal state allowing a stretching free from irregularity.

If it is tried to suppress the haze after the heating below 40%, the stretching condition is restricted and it becomes difficult to obtain uniform and transparent products in many cases, and a severe restriction is posed to the selection of the resins forming the multilayer product.

It is preferred that the haze is increased by at least 5%, more preferably by at least 10%, particularly preferably 20% or more, prior to the stretching.

The heating for the crystallization prior to stretching may be performed by appropriately adopting a method of infrared ray heating, hot air heating, electromagnetic heating, heating with a heating medium. The heating temperature may preferably be at least $Tc1$ (crystallization temperature in the course of temperature increase), more preferably $Tc1+$ at least 1° C., further preferably $Tc1+$ at least 5° C. and below $Tm$ (melting point) of PGA resin. More specifically, a range of 80-200° C., particularly 90-150° C., is preferably adopted. The heating step and the subsequent stretching can be successive or non-successive.

(Stretching)

An opaque resin laminate having an increased haze of at least 40%, particularly at least 50% in the case of using PGA homopolymer, resultant after the above heating and crystallization, is thereafter subjected to a various shaping method accompanied with stretching corresponding to a shape of the objective multilayer stretched product. As mentioned above, the multilayer stretched product according to the present invention including a PGA resin layer and another thermoplastic resin layer may assume various forms, such as films, sheets, extrusion products and hollow shaped products. The films may preferably assume a form of a stretched film or a heat-shrinkable film. The sheets may be further formed into containers or vessels, such as trays and cups, by sheet-forming technique, such as vacuum forming or pressure forming. The hollow shaped products may include blown containers, and stretched-and-blown containers. Further, it is also possible to apply an inflation technique. In the course of such a shaping process, the resin laminate is stretched. The stretching may be either uniaxial or biaxial (simultaneous or successive). The preferable degree of stretching can vary depending on the use of the shaped product but may preferably at least 2 times, particularly ca. 4-25 times, in terms of an areal ratio, from the view points of increased strength, improved gas-barrier property, improved moisture resistance, etc.

Due to the effect of crystal stretching, the multilayer stretched product after the stretching is provided with a haze of at most 10% decreased from the haze of at least 40% before the stretching, regardless of its thickness.

(Post Treatment)

After the above stretching-shaping, it is possible to add a post treatment, such as heat-setting, or a post step, such as a lamination processing or coating for providing an additional resin layer. The treatment temperature for heat-fixation may preferably be ca. 40-210° C., and at a temperature below the melting point of the PGA resin, more preferably in a temperature range of 10-70° C. below the melting point of PGA resin.

The lamination processing may include wet lamination, dry lamination, extrusion lamination, hot melt lamination, and non-solvent lamination.

(Gas-Barrier Multilayer Stretched Product)

The gas-barrier and transparent multilayer stretched product obtained according to the present invention is suitably used as a bottle as represented a PET bottle or a packaging film like a wrapping film or for meat packaging, etc. Further, if a principal resin layer of the multilayer stretched product is composed of a biodegradable resin similar to PGA resin, a biodegradable and gas-barrier multilayer stretched product can be provided.

EXAMPLES

Hereinbelow, the present invention will be described more specifically based on Examples and Comparative Examples.

The physical properties described herein including those described below are based on values measured according to the following methods.

(1) Haze (%)

Measured by using "HAZE METER TCH-III-DP" made by Tokyo Denshoku K. K. A preform sample was split vertically, and the curved concave surface was exposed to incident light for the measurement. As for a bottom sample, a flat surface body part was cut out, and the inner surface thereof was exposed to incident light for the measurement.

(2) Parison Surface Temperature

Measured by using a non-contact thermometer ("IT2-50", made by K. K. Keyence).

(3) Oxygen Permeability

Measured by using "OX-TRAN 2-20" made by Mocon Co. As for a bottle sample, an adapter was attached to the mouth thereof for measurement at a temperature of 23° C., a bottle inside humidity of 80% RH and a bottle outside humidity of 50% RH. As for a film sample, the measurement was performed at a temperature of 23° C. and a humidity of 80% RH.

(4) Thermal Properties

A differential scanning calorimeter (made by Metter Instrumente A.G.) was used for measurement of the following heat capacity transition Ts.

Tg: Secondary transitions temperature on a calorie curve in the course of temperature increase Tc1: Exothermic peak top temperature due to crystallization in the course of temperature increase Tm: Endothermic peak top temperature due to crystal melting in there course of temperature increase Tc2: Exothermic peak top temperature due to crystallization in the course of temperature decrease (5) Melt Viscosity Measured by using "CAPILOGRAPH 1-C" made by Toyo Seiki K. K. equipped with a capillary (1 mm-diameter×10 mm-length) at a temperature of 270° C. and a shear rate of 122 sec$^{-1}$.

(6) Weight-Average Molecular Weight

Measured by using a GPC apparatus ("Shodex-104, made by Showa Denko K.K.) with two columns of "HF1P606M" (made by Showa Denko K.K.) and using a 5 mM-solution of sodium trifluoroacetate in hexafluoroisopropanol as the elution liquid and an RI (refractive index) detector. Molecular calibration was performed with polymethacrylic acid standard molecular weight samples.

Examples 1 and 2

PET ("Grade 9921," IV=0.8 (by catalogue), made by Eastman Kodak Co.) and PGA homopolymer A (Tc1=90° C., Tm=221° C., Melt viscosity=920 Pa.s, weight-average molecular weight=220,000) were respectively injected (melt-processed) by means of an injection molding machine equipped with two cylinders to form U-shaped parisons (precursors for formation of a bottle by stretch-blow molding having a vertical sectional shape of character "U", having a total weight of 28 g, a thickness of 3.7 mm at the body) wherein the PGA homopolymer occupied 8 wt %.

The U-shaped parisons were subjected to stretch-blow molding at a rate of 900 BPH (bottles per hour) by using a stretch-blow molding apparatus ("SBO-1", made by SIDEL Co.) under the conditions of re-heating to a surface temperature of 97° C. (Example 1) or 105° C. (Example 2) in a temperature-rising time of 20 sec. and a holding time of 20 sec. by means of an IR (infrared) heating apparatus, immediately followed by stretch-blow molding into a mold at 5° C. with compressed air, to obtain transparent bottles of 500 ml in volume and a thickness of 0.4 mm at the body. The hazes of injected and cooled U-shaped parisons, re-heated U-shaped parisons and bottles after the blow molding are shown in Table 1 below. Incidentally, the hazes of the re-heated U-shaped parisons were measured by quenching the U-shaped parisons just after discharge out of the IR heating apparatus (formed in parallel with those subjected to stretch blow molding) with liquid nitrogen and measuring the quenched parisons. The surface temperatures of the U-shaped parisons immediately after discharge out of two IR apparatus were measured by a non-contact type thermometer.

TABLE 1

| Example | U-shaped parison | | | Bottle | |
| | Haze after cooling (%) | Reheated surface temp. (° C.) | Haze after re-heating (%) | Haze (%) | Oxygen permeability (cc/bottle/day) |
| --- | --- | --- | --- | --- | --- |
| 1 | 38 | 97 | 84 | 3 | 0.05 |
| 2 | 38 | 105 | 83 | 0.5 | 0.05 |

It is noted that the hazes exceeding 80% of the parisons after the re-heating were abruptly lowered to 3-0.5% after the stretch-blow molding to have provided transparent bottles with good gas-barrier property.

Example 3

U-shaped parisons (having a haze of 38%) were prepared by injection and cooling in the same manner as in Example 1, and then heated at 50° C. for 24 hours for crystallization to provide the parisons with a haze of 57%. The U-shaped parisons were re-heated to 97° C. in a temperature-rising time of 20 sec. and holding time of 20 sec. in the same manner as in Example 1, followed by injection molding to obtain bottles. The results are summarized in Table 2

TABLE 2

| U-shaped parison | | | | Bottle | |
| Haze after cooling (%) | Reheated surface temp. (° C.) | Haze after heating at 50° C. for 24 hrs (%) | Haze after re-heating (%) | Haze (%) | Oxygen permeability (cc/bottle/day) |
| --- | --- | --- | --- | --- | --- |
| 38 | 97 | 57 | 84 | 1 | 0.05 |

Example 4

Bottles were prepared by formation of U-shaped parisons, re-heating and blow molding in the same manner as in Example 1 except for using a PGA/PLA (95/5 by weight) copolymer (Tc1=100° C., Tm=209° C., melt viscosity=640 Pa.s, weight-average molecular weight=180,000) instead of PGA homopolymer and re-heating to a temperature of 115° C. in a temperature-rising time of 35 sec. and a holding time of 20 sec. The results are summarized in Table 3.

TABLE 3

| U-shaped parison | | | Bottle | |
| Haze after cooling(%) | Reheated surface temp.(° C.) | Haze after re-heating(%) | Haze(%) | Oxygen permeability (cc/bottle/day) |
| --- | --- | --- | --- | --- |
| 38 | 115 | 81 | 1 | 0.09 |

Example 5

Bottles were prepared by formation of U-shaped parisons, re-heating and blow molding in the same manner as in Example 1 except for using another PGA homopolymer (Tc1=93° C., Tm=220° C., melt viscosity=1150 Pa.s, weight-average molecular weight=240,000) instead of PGA homopolymer A used in Example 1. The results are summarized in Table 4.

TABLE 4

| U-shaped parison | | | Bottle | |
|---|---|---|---|---|
| Haze after cooling(%) | Reheated surface temp.(° C.) | Haze after re-heating(%) | Haze(%) | Oxygen permeability (cc/bottle/day) |
| 38 | 95 | 84 | 1 | 0.05 |

INDUSTRIAL APPLICABILITY

As described above, according to the present invention, there is provided a transparent multilayer stretched product including a polyglycolic acid resin layer and suitable as a gas-barrier packaging material or container by effectively utilizing crystal stretching of polyglycolic acid resin.

The invention claimed is:

1. A process for producing a transparent multilayer stretched product, comprising: providing a resin laminate including at least one layer of polyglycolic acid resin, heat-forming and cooling the resin laminate, reheating the laminate to a temperature of Tc1 (crystallization temperature in the course of temperature increase)+ at least 1° C. until the polyglycolic acid resin layer is crystallized to be opaque, as represented by a haze of at least 40%, and then stretching the re-heated resin laminate to provide a stretched resin laminate with a reduced haze of at most 10%.

2. A process according to claim 1, wherein the resin laminate after the cooling is transparent.

3. A process according to claim 1, wherein the polyglycolic acid resin occupies at most 10 wt. % of the resin laminate.

4. A process according to claim 1, wherein the polyglycolic acid resin layer comprises a polyglycolic acid resin having a sufficiently high content of polymerized glycolic acid units as to exhibit a gas-barrier property.

5. A process according to claim 4, wherein the polyglycolic acid resin comprises glycolic acid homopolymer.

6. A process according to claim 1, wherein the resin laminate includes an aromatic polyester resin layer in addition to the polyglycolic acid resin layer.

7. A process according to claim 1, wherein the resin laminate includes another biodegradable resin layer in addition to the polyglycolic acid resin layer.

* * * * *